(12) United States Patent
Peng et al.

(10) Patent No.: US 7,369,514 B1
(45) Date of Patent: May 6, 2008

(54) SOURCE CREDIT BASED FAIRNESS SCHEME

(75) Inventors: Wang-Hsin Peng, Ottawa (CA); Richard Deslandes, Carp (CA)

(73) Assignee: Nortel Networks Limited (CA)

( * ) Notice: Subject to any disclaimer, the term of this patent is extended or adjusted under 35 U.S.C. 154(b) by 1034 days.

(21) Appl. No.: 10/636,037

(22) Filed: Aug. 7, 2003

Related U.S. Application Data

(60) Provisional application No. 60/479,312, filed on Jun. 18, 2003.

(51) Int. Cl.
*H04L 12/28* (2006.01)
(52) U.S. Cl. ............... 370/258; 370/230; 370/452; 370/460; 370/468
(58) Field of Classification Search ............ 370/229, 370/230, 230.1, 231, 258, 352, 395.4, 395.41, 370/452, 459, 460, 468
See application file for complete search history.

(56) References Cited

U.S. PATENT DOCUMENTS

| | | | | |
|---|---|---|---|---|
| 4,926,418 A | * | 5/1990 | Cidon et al. ............. | 370/455 |
| 5,339,314 A | * | 8/1994 | Tanaka et al. ............ | 370/230 |
| 5,467,352 A | * | 11/1995 | Cidon et al. ............. | 370/452 |
| 5,517,498 A | * | 5/1996 | Hauris et al. ............ | 370/431 |
| 7,016,969 B1 | * | 3/2006 | Uzun et al. ............. | 709/233 |
| 2002/0018481 A1 | * | 2/2002 | Mor et al. .............. | 370/403 |
| 2003/0035436 A1 | * | 2/2003 | Denecheau et al. ....... | 370/452 |
| 2003/0163593 A1 | * | 8/2003 | Knightly ................. | 709/251 |

* cited by examiner

*Primary Examiner*—Firmin Backer
*Assistant Examiner*—Nguyen Ngo
(74) *Attorney, Agent, or Firm*—Anderson Gorecki & Manaras LLP

(57) ABSTRACT

A method and apparatus for minimizing starvation of a station in a ring networked environment includes allocating a tax to each of the stations in the ring, and, for each packet that is to be transited though the ring, providing bandwidth to the station in the form of a tax packet, which allows the station to have ring access.

14 Claims, 8 Drawing Sheets

SOURCE CREDIT BASED FAIRNESS SCHEME

CROSS REFERENCE TO RELATED APPLICATIONS

This application claims priority to provisional patent application Ser. No. 60/479,312 filed Jun. 18, 2003.

FIELD OF THE INVENTION

This invention relates generally to the field of networking and more particularly to a method and apparatus for bandwidth balancing in a networked environment.

BACKGROUND OF THE INVENTION

Resilient Packet Ring technology is a Layer 2 networking technology that defines the manner in which bandwidth is used by transmitting stations in a fiber ring network. In Resilient Packet Ring (RPR) technology, at least two counter rotating fiber ringlets couple a ring of stations, thereby allowing the stations to share available bandwidth without each station needing additional bandwidth provisioning logic.

In general, Resilient Packet Rings (RPR) permits stations, or stations, on a ring to automatically negotiate for bandwidth among themselves via a Fairness Algorithm. Each station has a topology map of the ring and can send data on the optimal ringlet towards its destination. Feedback regarding the congestion at each station is provided to each station during operation.

One feature of the RPR architecture is that it permits 'spatial reuse', that is, communication between different stations may occur during the same time window, since each station is using a different span of the ringlet. For example, when sending a unicast packet, the source determines which ringlet should be used based on information included in a topology map. The shortest hop count path to the destination is one method. When the packet arrives at its destination, it is removed from the ring, and thus bandwidth is consumed only on the spans between the source and the destination. The remaining spans on the ringlet remain idle, and are therefore available for use by other stations.

Because there exists the capability for spatial reuse in RPR networks, it may occur that the network is oversubscribed. Thus, stations may be advertised as capable of supporting a certain bandwidth which exceeds the instantaneous bandwidth capabilities of the network but is achievable due to the spatial reuse. In addition, certain stations may be deemed as higher priority stations than others in the network. As a result of the combination of prioritized stations and oversubscription of network resources, it may occur that some stations in the ring become starved for network resources. Various fairness mechanisms have been introduced to ensure that each station is permitted access to the network. However, the implantation of these fairness mechanisms requires feedback and computation, and therefore increases the overall complexity of the ring network. Furthermore they do not completely remove the starvation problem unless the ring bandwidth is pre-allocated or provisioned. It would be desirable to provide a base RPR transmission architecture which overcomes the starvation problems of the existing architecture for all class of traffic supported on the ring.

SUMMARY OF THE INVENTION

According to one aspect of the invention, a method of guaranteeing bandwidth to a downstream station that is downstream from an upstream station in bidirectional or a unidirectional ring arrangement includes the step of: allocating a determined number of transmit opportunities to the downstream station for each packet that transits through the downstream station by the upstream station.

According to another aspect of the invention, a method of controlling a first rate of transmission of packets at a station is described. The station is coupled to at least one other station in a ring arrangement. The method includes the steps of determining a credit bandwidth of the at least one other station, the credit bandwidth corresponding to a second rate of transmission of packets allocated to the at least one other station, transmitting available packets at the station to downstream stations in the network, and reserving bandwidth for the at least one other station for each available packet that transits the at least one other station, wherein an amount of reserved bandwidth is determined in accordance with the credit bandwidth of the at least one other station.

According to a further aspect of the invention, a method for controlling a transmission of packets by a station coupled to a plurality of other stations in a ring arrangement includes the steps of storing a value for each of the other stations, the value associated with a bandwidth allocated to the other station; and selecting between a first packet and a second packet for transmission to the downstream station in response to the values associated with of each of the other stations.

An apparatus for controlling a transmission of packets by a station is described. The apparatus is coupled to a plurality of other stations in a ring arrangement, and includes a table comprising an entry for each of the other stations. The entry includes a value associated with a bandwidth allocated to the other station and selection logic for selecting between a first packet and a second packet for transmission to a neighbor station, the selection logic operating in response to the values of each entry in the table.

According to a further aspect of the invention, a ring network architecture includes a plurality of stations coupled by at least one unidirectional ring, and means for ensuring access to the unidirectional ring by each one of the plurality of stations. The means for ensuring access includes a table, at each one of the plurality of stations, for storing a reserved bandwidth of each of the other ones of the plurality of stations means. The apparatus includes means at a first station in the ring, for selecting either a packet destined for a second station in a ring or a tax packet for transmission by the first station, the means for selecting operating in response to the reserved bandwidths of any station disposed between the first station and the second station in the ring.

According to another aspect of the invention, a station in a unidirectional ring architecture includes means for guaranteeing bandwidth to a downstream station that is downstream from the station on the unidirectional ring, including means for allocating a determined number of transmit slots to the downstream station for each packet that transits through the downstream station.

With such an arrangement, by reserving bandwidth for each station by providing bandwidth to the station for each packet that transits the station, the opportunity for starvation of any given station in the network is eliminated.

DESCRIPTION OF THE PREFERRED EMBODIMENT

Figure 1A:
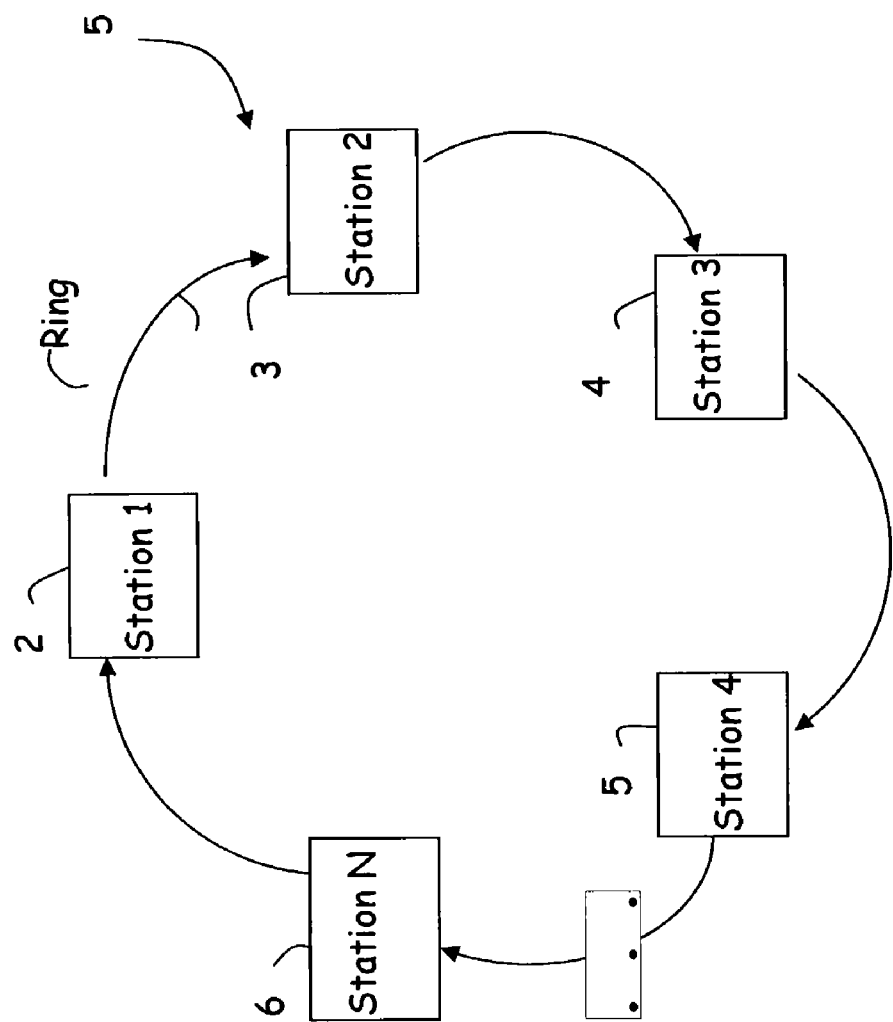
FIG. 1a is a diagram of an exemplary unidirectional packet ring network in which only a single ring exists.
Figure 1B:
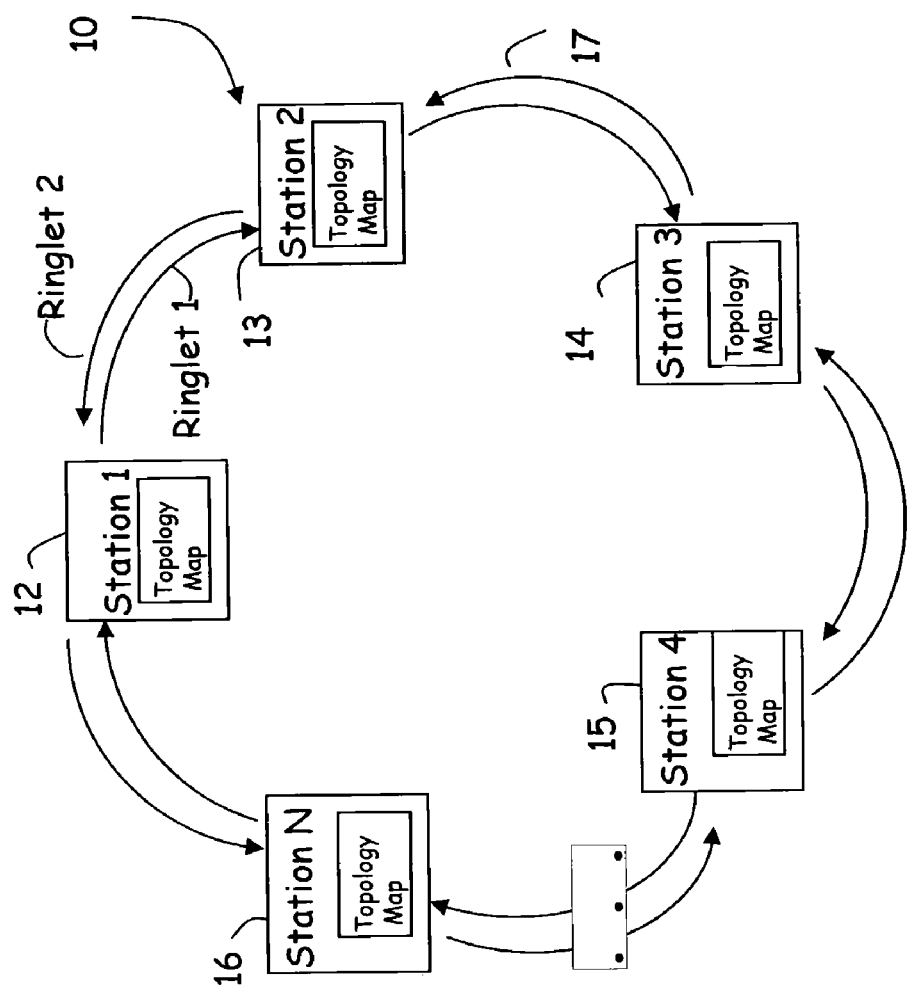
FIG. 1b is a diagram of an exemplary resilient packet ring (RPR) network in which the present invention may be implemented.

A basic architecture of a uni-directional ring 5 is illustrated in FIG. 1a. In the uni-directional ring architecture of FIG. 1a, data and control packets pass from station to station one direction in a controlled manner. For example, should a source station such as node 2, seek to communicate with a destination station 6, the data is first transferred to stations 3, 4 and 5 before it reaches its destination. Uni-directional rings are among the least complex architectures, but often the delays associated with traversing the rings in one direction make them a less desirable architecture. An alternative ring architecture is a resilient packet ring (RPR) such as illustrated in ring 10 in FIG. 1. The RPR architecture is defined by the IEEE 802.17 Resilient Packet Ring Standard, incorporated herein by reference. The present invention provides an enhancement to either the uni-directional ring architecture of FIG. 1a or the RPR architecture of FIG. 1b, that guarantees that starvation of stations within the ring is minimized or eliminated. The below description will first introduce some elements of the RPR standard to provide a basic construct for which the invention can be described, and then exemplary components and processes that may be used in various embodiments of the invention will be described in more detail.

The RPR standard defines a media access control (MAC) protocol to control the manner in which available bandwidth is used by transmitting stations. The basic architecture includes a number of counter rotating ringlets, such as ringlet 1 and ringlet 2 in FIG. 1b, which couple a number of stations into a ring arrangement. Each portion of the ring, such as portion 17 that couples station 2 to station 3, is referred to hereinafter as a 'span.' At a given time, each station transmits a packet onto its coupled downstream span to the nearest downstream neighbor. Transmission within the ring is uni-directional in either a clock wise or counter-clock wise direction. A station that initiates a transmission is said to be an upstream station, and any subsequent station that receives the transmission, as it traverses the ring, is said to be downstream from the upstream station.

Each station has a layer 2 MAC address. A station can send packets to a single other station within a unicast destination address, or to multiple nodes with a multicast destination address. When sending a unicast packet, the source determines which ringlet is used based on information containing in a topology map depicted in FIG. 1b. When the packet arrives at its destination, it is removed from the ring, and thus bandwidth is consumed only on the spans between the source and the destination. In order to reach the destination, the packet may need to be forwarded by stations between the source and destination. For the purposes of this specification, stations that are disposed between a source and destination station during a communication are said to be intermediate stations, and the forwarding of a packet through these stations without alteration or modification by the intermediate station is hereinafter referred to as the packet 'transiting' through the intermediate station.

When a packet arrives at the destination station, it is removed from the ring, and therefore in RPR networks bandwidth is only consumed on the spans between the source and destination stations. The remaining spans on the ringlet remain idle and available for use by other stations and data stream, thus resulting in spatial re-use that results in an overall bandwidth capacity of the ring that exceeds the available instantaneous bandwidth capacity of a single span over the entire ring.

Figure 2:
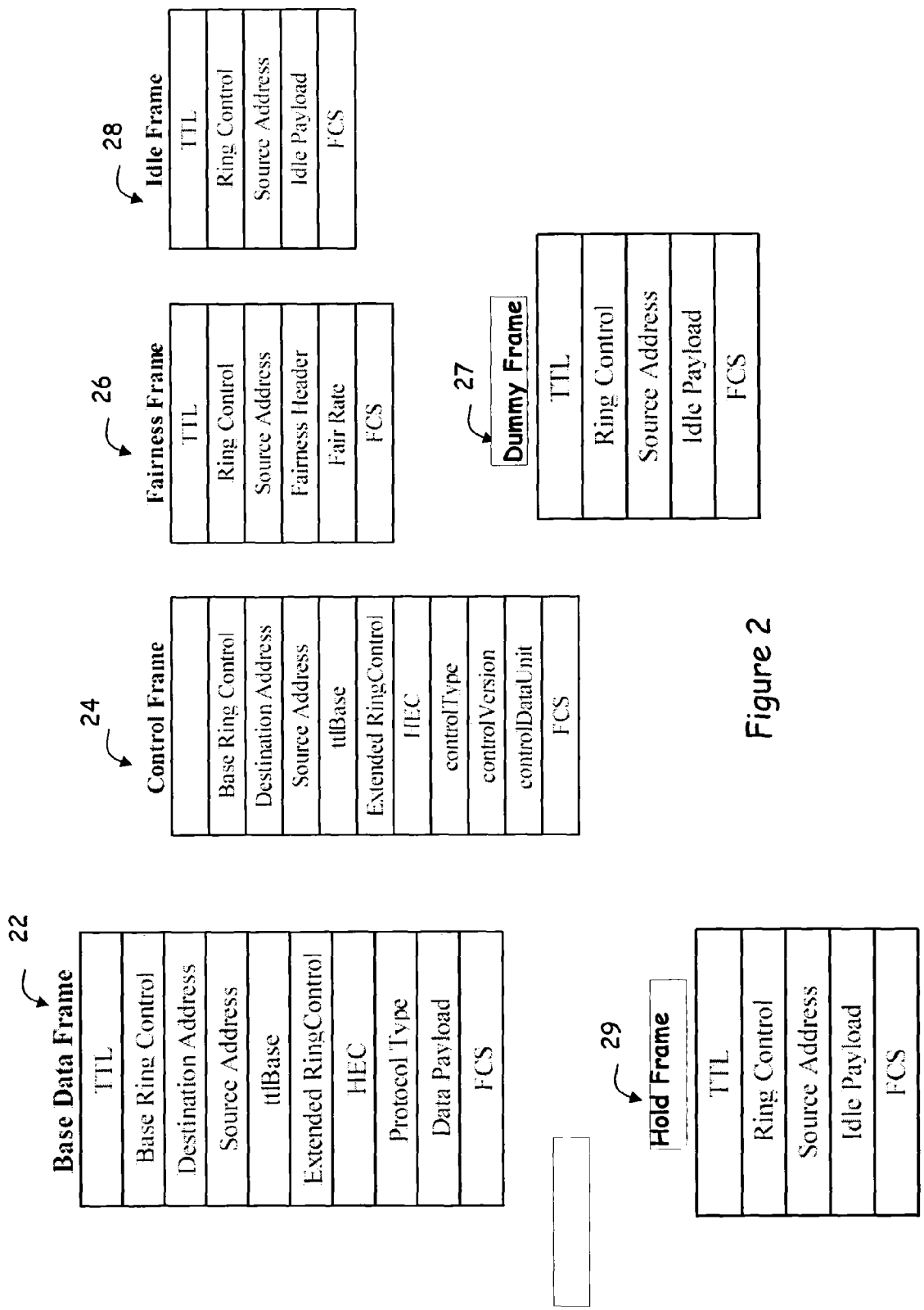
FIG. 2 illustrates exemplary MAC frame formats for RPR packets.

FIG. 2 illustrates the basic resilient packet ring MAC frame format. The 802.17 RPR MAC defines a data frame format 22, a control frame format 23, a fairness frame format 24 and an idle frame format 25.

The Basic data frame 22 is generally used to forward packet frame data to other stations in the ring. It is shown to include various fields including Time To Live (TTL), Base Ring Control, Destination Address, Source Address, ttlBase, Extended Ring Control, Head Error Control (HEC), Protocol Type, Data Payload, and Frame Check Sequence (FCS) field.

The Base Ring Control field is an eight bit field that defines how the associated packet is to be handled on the ring. Exemplary fields of the Ring Control field include a Ring ID field, for indicating whether the frame is transmitted on ringlet 1 or ringlet 2, a Fairness Eligible bit, for indicating whether the frame should be considered by a fairness algorithm, a Frame Type field comprising two bits indicating whether the frame is a Reserved, Control, Fairness or Data frame, a Service Class field comprising two bits for indicating whether the frame is belongs to any of classes C, B or A (where class A is a high priority class, class B is a medium priority class and class C is a relatively lower priority class). Other ring control fields may be provided and the present invention is not limited to any particular ring control functionality. In addition, according to one aspect of the invention, the ring control field is extended to include encodings identifying two new types of frame including a Dummy frame and a Hole frame, as will be described in more detail below.

The Control frame 24 includes fields similar to those described with regard to the Data frame 22, but is used to forward control information for controlling various functionality at each of the stations in the ring. The type of control is defined in the control type field, which includes one byte indicating whether the control frame is of a station configuration type, a topology/protection type, or an Operation Administration and Maintenance type (OAM).

Fairness frame 26 includes a number of fields which are used in the 802.17 to ensure fairness in the network participation by each of the nodes on the network. In general, the present invention includes several features which enhance any of the operations of these fields by providing a view of actual bandwidth use at each station, and guaranteeing a certain amount of bandwidth to the station to prevent starvation.

Idle frame 28 or Idle delineation pattern are transmitted when each of the stations has no data to forward to its downstream neighbor during a transmit period. In general, the Idle frame includes ring control fields similar to those described with regard to the data frame, and a source field including the MAC address of the station that transmits the Idle frame. Idle delineation pattern are not processed by the receiving MAC it is used as filler to indicate a unused time period. An example of an idle indicator is the 7E flag in HDLC protocol.

According to one aspect of the present invention, two new frame formats are provided, a Dummy frame 27 and a Hole frame 28. As can be seen in FIG. 2, both the Dummy frame and the Hole frame formats are similar to the IDLE frame format. The distinction between Dummy frames and IDLE frames is the motivation, at the station, for issuing the packet. A station can either send idle pattern or IDLE frame when a station has no other data to transmit. A IDLE frame is received by the MAC where as idle patterns are not. A Dummy frame, (also interchangeably called herein a Tax packet), is forwarded by a transmitting station to a downstream neighbor as a 'tax' to the downstream neighbor for the downstream neighbor permitting the transmitting station to transit packet traffic through the downstream station. By providing 'dummy' or 'tax' packets to downstream neighbors in this manner, it can be ensured that the downstream neighbor is always going to have some opportunity to transmit packets, thereby completely eliminating the opportunity for starvation of any station in the ring.

A Hole packet is also similar in format to the IDLE packet, with the distinction between the two being both the motivation at the transmitting station for sending the packet, and the manner in which the packet may be used by any downstream neighbors. As will be described in more detail below, a Hole packet (or frame) is forwarded by a transmitting station back to itself around the ring. A Hole packet may be transmitted by a station when the station wants to ensure that it will have an opportunity to transmit in N time window (where N is the number of stations in the ring). The transmitting packet effectively wedges a hole into the bandwidth. The hole will not be used by other stations in the ring, since they are not the indicated destination station. As will be described in more detail with regard to FIG. 6 below, the Hole packet can be sent with or without a valid data field FIG. 2 illustrates a Hole packet having only a source address; the inference being that an individual type format is used to distinguish this packet format over others. However, alternative embodiments, where a simple data frame format such as frame 22 is used with the source and destination address being equal could also be used, and the present invention is therefore not limited to any particular mechanism for identifying a Hole type packet.

Figure 3:
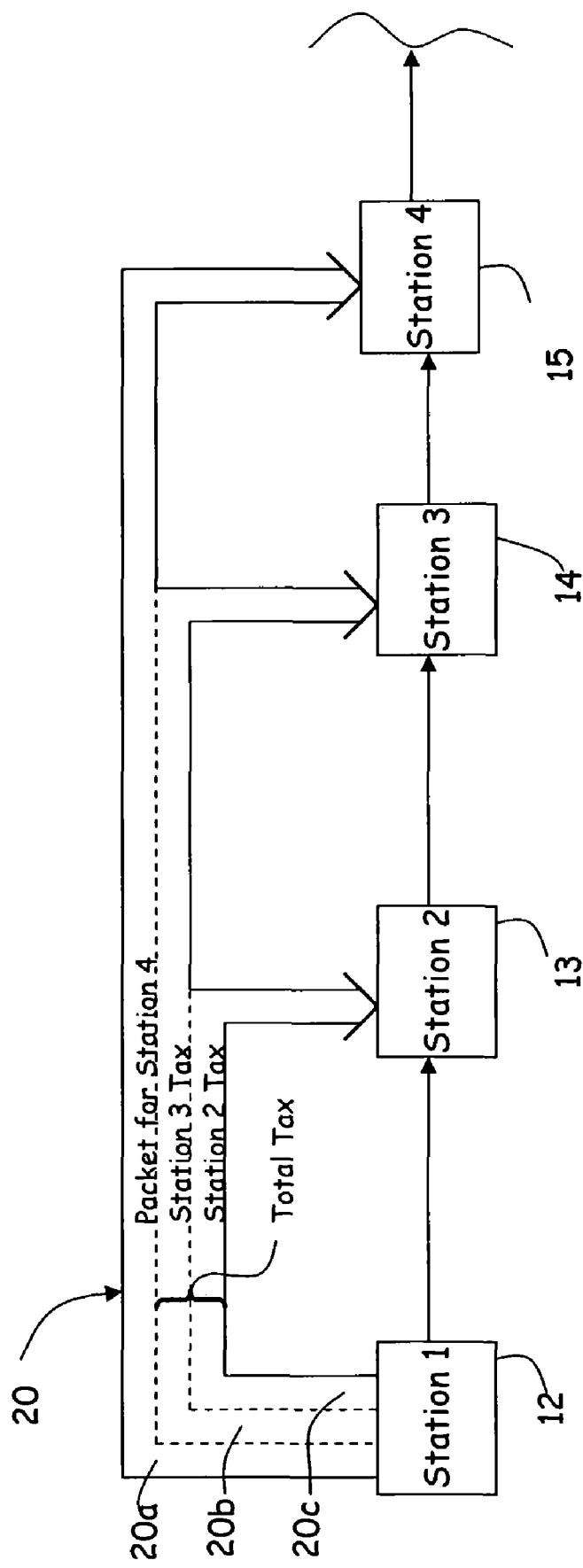
FIG. 3 is a conceptual block diagram for illustrating the provision of bandwidth to stations through which a packet transits during a communication between a source station and a destination station in accordance with the present invention.

Referring now to FIG. 3, a conceptual flow diagram provided for indicating the provisioning of bandwidth to intermediate stations on the ring will now be described. When station one 12 has data to forward to station four 15, the packet transits through station two 13 and station three 14 before reaching the destination station four 15. In order to ensure that stations 2 and 3 do not become starved for network resources, a certain amount of bandwidth is allocated to station 2 (Station 2 tax) and station 3 (Station 3 tax) for each transmission to station 4. The amount of bandwidth is referred to as a 'tax' that is to be paid to the intermediate stations, to in essence 'pay' for the ability to transit traffic through the station. As mentioned above, the tax is paid by forwarding dummy frames to the intermediate stations. When an intermediate station receives the dummy frame, it can replace the dummy frame with data that it seeks to transmit. By providing the dummy frames to the intermediate stations it can be guaranteed that intermediate stations do not become starved for network resources.

The tax may be paid in a variety of manners. For example, the protocol may be defined to ensure that dummy frames are always paid prior to the use of the transit data paths of the intermediate nodes by the transmitting station. Alternatively, the dummy packets may be interspersed with the communication between stations one and four, or may be paid after communication is complete. The exact manner by which the dummy packets are distributed to the intermediate nodes is not important, rather the fact that they are paid at some point ensures that the station will have the opportunity to transmit its own data on the span. Over a larger time period the small variation average out to the desired value.

Figure 4:
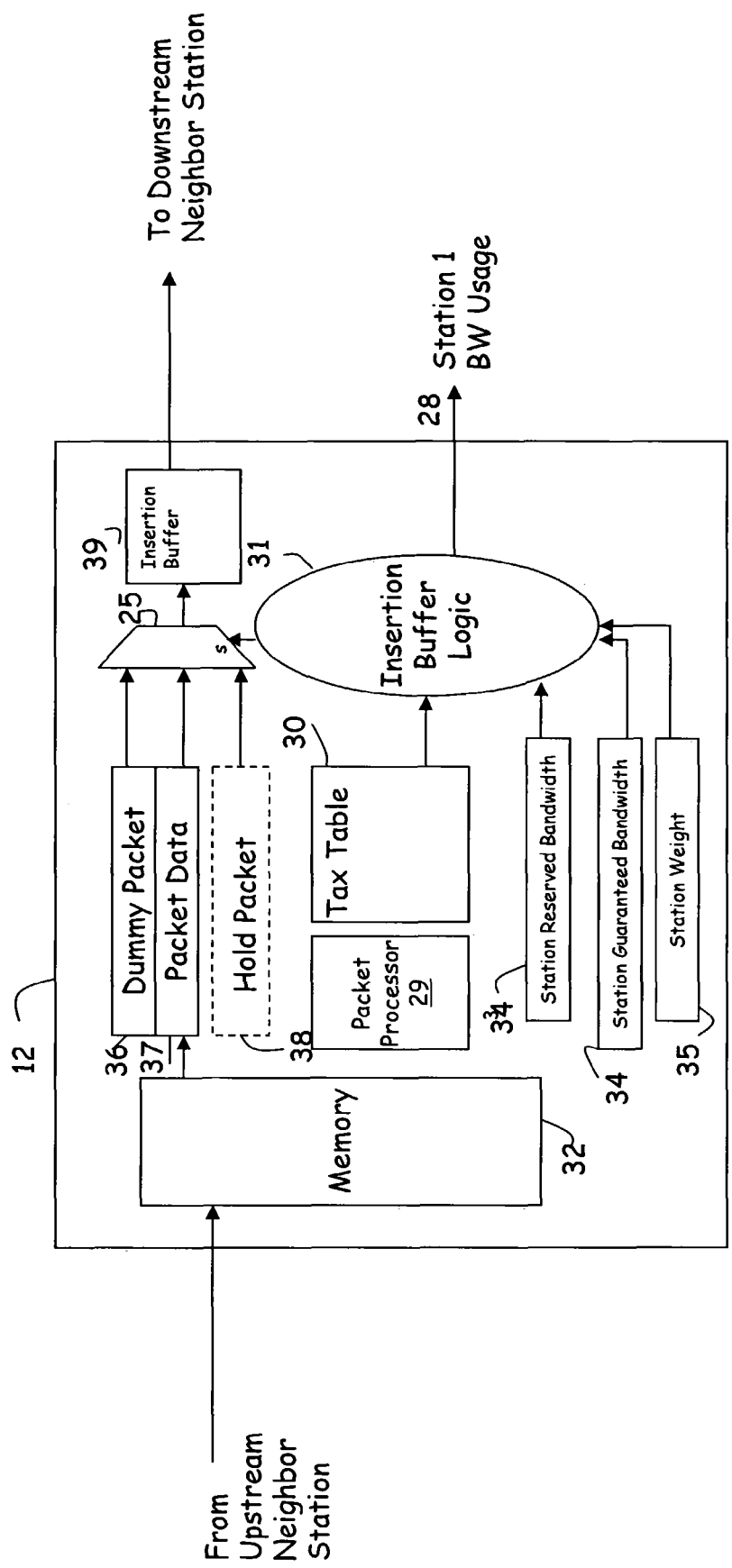
FIG. 4 is a block diagram of some of the exemplary components that may be included in a station operating according to the present invention.

Referring now to FIG. 4, a block diagram of one embodiment of a station 12 is shown including various functional blocks. It is of course understood that the station includes additional functionality which, for ease of explanation, is not included herein. It should also be understood that the various functional blocks may be implemented in hardware, software, or some combination thereof, and the present invention is therefore not limited to any particular station architecture, but may be expanded to cover any design that includes equivalent functionality. In addition, for ease of discussion, the station 12 may be referred to below as a host station.

FIG. 4 is shown to include a memory 32 which represents storage that is generally provided in a station for temporarily storing data received from an upstream neighbor station. Coupled to the memory 32 is an output packet datapath that includes a packet data buffer 37, a selector 25 and an insertion buffer 39. According to one implementation of the resilient packet ring technology, and insertion buffer 39 is provided in this manner to allow for fast insertion of various packet data onto the resilient ring for each time slot. Details regarding the insertion buffer technology are described in more detail in co-pending application Ser. No. 09/441,514, entitled Methods and Devices for Adding and Removing Data from Serial Data Streams, filed on Nov. 17, 1999 by Hurren et al, and incorporated herein by reference.

Each station includes a packet processor 29 which operates to control packet forwarding, processing and handling according to a protocol of the station. In FIG. 4 a number of registers are explicitly shown, including Station Reserved Bandwidth register 33, Station Guaranteed Bandwidth register 34 and Station Weight 35. Although these registers are shown explicitly in FIG. 4 it should be understood that these values may alternatively be stored in a data structure in memory, or within the packet processor 29 for ease of access, and thus the present invention is not limited to any particular mode of storing these values. According to one embodiment, the Station Reserved Bandwidth is the maximum amount of bandwidth that the host station desires to utilize. The Station Guaranteed Bandwidth is the minimum amount of bandwidth that the host station needs to operate. The Reserved Bandwidth may be greater than or equal to the Guaranteed Bandwidth, and as described before it may be a bandwidth contracted for by the station coupled to the ring. The Station Weight basically identifies a priority of the host station when viewed in respect of the weights of the other stations in the ring. According to one embodiment of the invention, the Guaranteed Bandwidth, Reserved Bandwidth and Weight are programmable by a network administrator.

Also illustrated in FIG. 4 is a tax table 30. The tax table 30 is a table having an entry for each of the other stations that are coupled to the given station in the ring. Should the host station be coupled to more than one ring, separate tables are maintained for each ring. Each entry stores a tax value indicative of an amount of bandwidth that needs to be transferred to the respective other station for any packet transmissions by the host station that transit the other station. For example, referring again to FIG. 2, the table 30 would include entries for station 2 and station 3, identifying the station 2 tax and station 3 tax that needs to be 'paid' to the respective stations for traffic forwarded to downstream stations.

Insertion buffer logic 31 receives input from the tax table 30 as well as the station reserved bandwidth register 33, the station guaranteed bandwidth register 34 and the station weight register 35 when determining what type of packet to forward to the next downstream station. The insertion buffer logic 31 thus provides a selection control to selector 25, which selects one of the packet data 37, dummy packet 36 or Hole packet 37. The packet data 37 may be either packet data that is sourced by the host station, or pass through packet data. In addition, the insertion buffer logic 31 forwards feedback via line 28 regarding the types of packets forwarded on the network. The feedback can be either send on the same ringlet in the same direction or on another ringlet in the opposite direction. This feedback is used in a manner that is described later herein to adjust the tax at the various stations.

Figure 5:
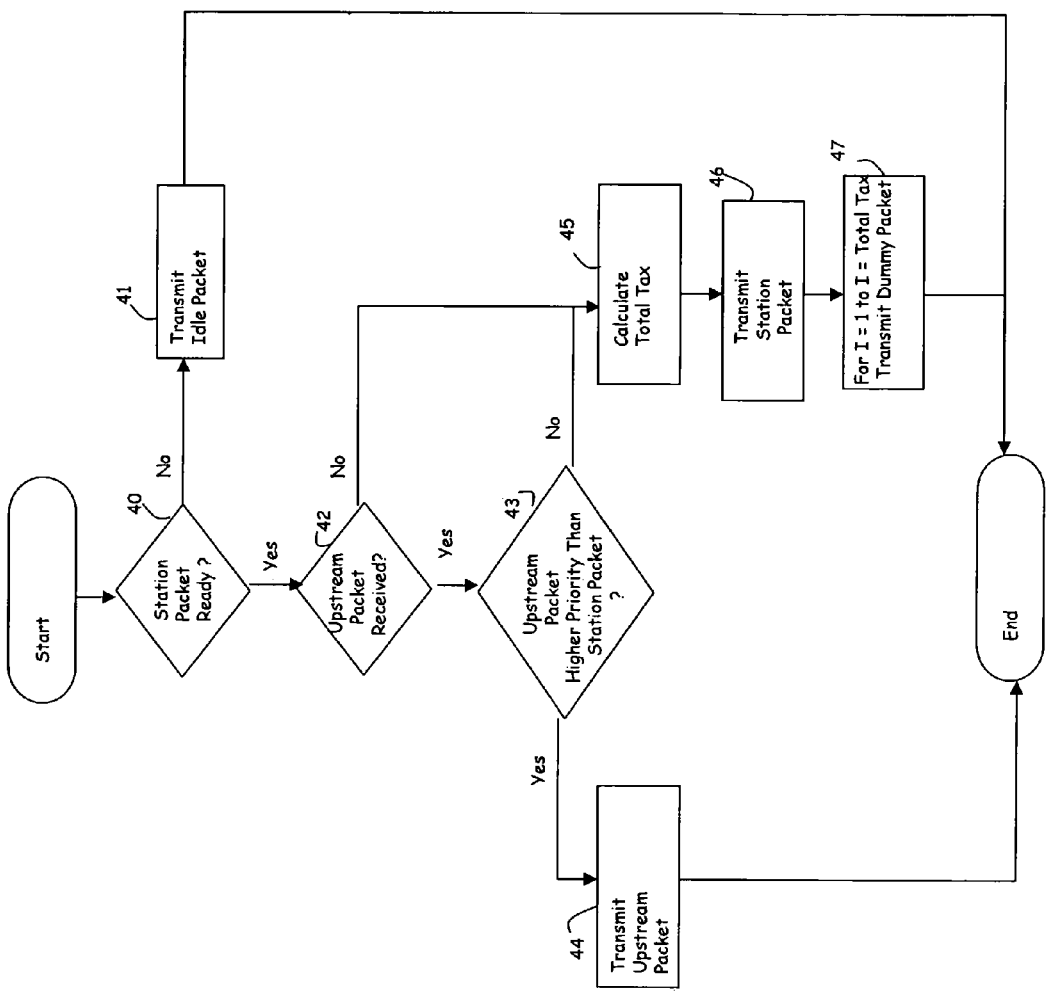
FIG. 5 is a flow diagram for illustrating exemplary steps that may be taken in the present invention to select a packet for transmission by a station in such a manner that starvation by other stations is minimized.

Referring now to FIG. 5, exemplary steps that may be performed in the present invention will now be described. In general, the decision process of FIG. 5 takes place for each transmit time slot. At step 40, the station determines whether it has a packet ready. If it does not have a packet ready, then at step 41 it transmits an IDLE packet to the next downstream station. If there is a packet ready, at step 42 it is determined whether there is an upstream packet waiting for transmission to the downstream station. If there is a pending upstream packet, then at step 43 it is determined if the upstream packet is a higher or lower priority than the host station packet (if there is one). If it is a higher priority, then the upstream packet is transmitted at step 44, and the process is completed. If at step 43 it is determined that the upstream packet is lower priority than the host station packet, or if at step 42 it was determined that there is no pending upstream packet, then at step 45 the total tax for transmission of the host station packet is calculated. The total tax is obtained by summing the tax values provided in tax table 30 for each of the intermediate nodes between the host station and the destination of the host station packet. At step 46, the host station packet is transmitted, then at step 47 a number of dummy packets corresponding to the calculated total tax value is transmitted to the downstream neighbor. Once all the dummy packets have been transmitted, the process is complete, and may return to step 40 for the following transmit cycle.

As mentioned earlier, other arrangements for delivering the dummy packets are also envisioned, such as transmitting one or more dummy packets prior to the transmission of the host station packet, or interleaving dummy packets with host station packets and/or flow through packets, and accordingly the present invention should not be limited to the series of steps illustrated in the embodiment of FIG. 5.

Figure 6:
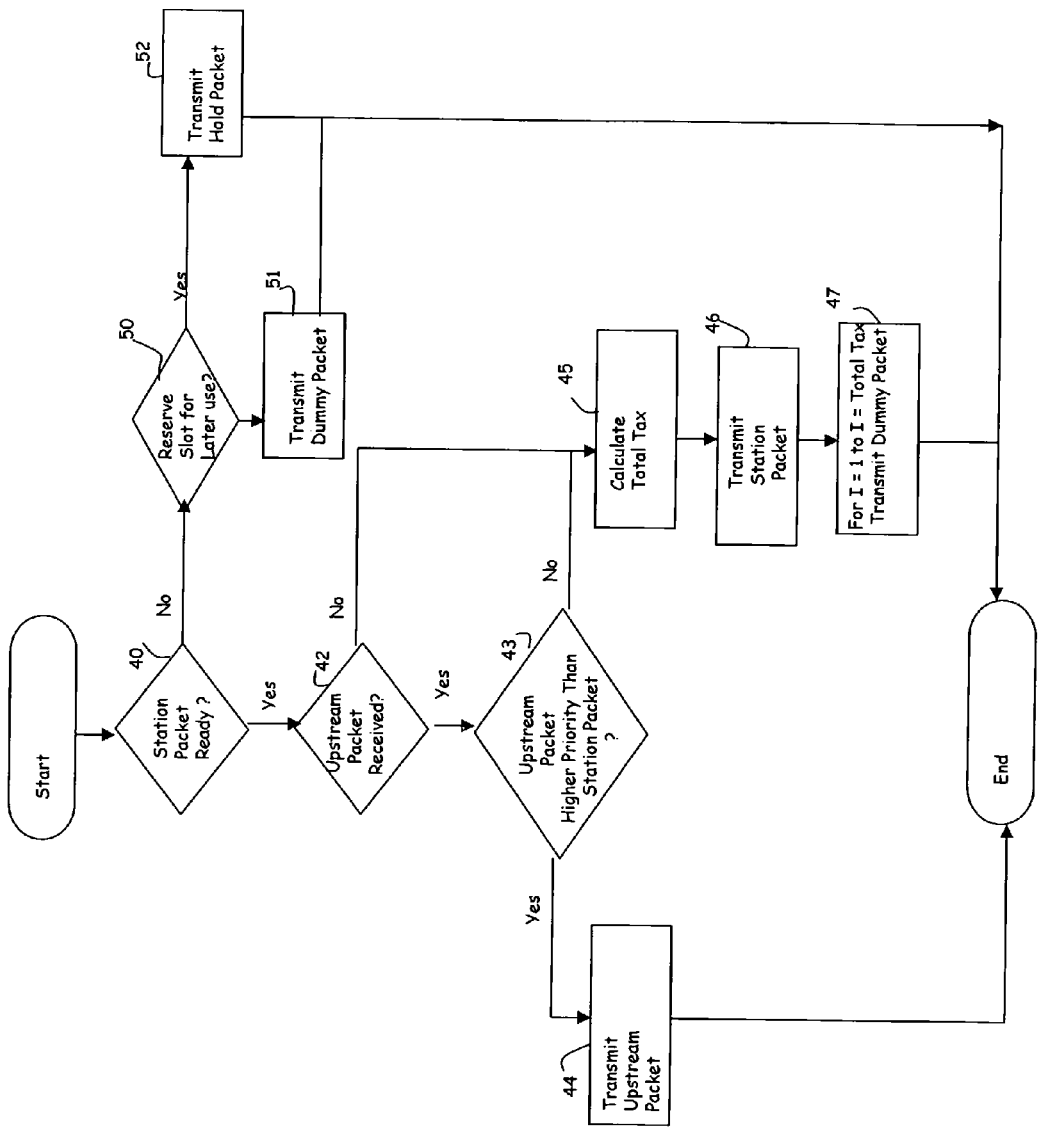
FIG. 6 is a flow diagram for illustrating exemplary additional steps that may be used in the process of FIG. 4 to reserve bandwidth for future use by the station.

Referring now briefly to FIG. 6, an alternate process by which a host station may guarantee its bandwidth by reserving future time slots is provided. Similar to FIG. 5, at step 40 the host station determines whether there is a station packet ready at step 40. If there is no station packet ready, then at step 50 it is determined whether the host station desires to reserve a time slot for future use. If it does, then at step 52 the host station transmits a Hole packet, with its MAC address in the source and destination fields. The effect of this transmission is that, when the Hole packet propagates around the ring back to the host station, the host station is guaranteed access to this time slot, and can replace the Hole packet with a desired output packet. As alluded to above, there are at least two types of Hole packets. The first type of Hole packet is used by a station to reserve bandwidth around the ring even when it does not have packets to sent. This allows a portion of bandwidth to always be available even when not used. A second type of Hole packet is a Hole+data packet, which sends useful data and holds on to a portion of the bandwidth. The multicast ability of the RPR standard is used to implement the Hole+data packet. Each station on the ring is assigned at least one unicast MAC address and one multicast address that is an easy transform of the unicast MAC address. When an originating station wants to send a Hole+data packet to another station, it simply sets the destination address to the appropriate multicast address and sets the TTL to the max value. A copy of the Hole+data packet is given to the destination station but the packets does not get removed from the ring. The packet will travel all the way back to the originator and will be removed by the originator (through the source stripping feature). Therefore the slot can then be re-used by the originating station.

A station can use both packets type in either static reservation mode or dynamic reservation mode. In static reservation, if a station has no packets to sends, it will continuously sent Hole packets equal to its reserved bandwidth. If the station has some packet to sends it will send Hole+data packets for its portion of bandwidth equal to its reserved rate. Any packets sent above its reserved rate (ie when it is bursting) are sent as normal data packets. One advantage of the static reservation system is that is provides fast access to bandwidth with low jitter. However, one disadvantage is that bandwidth usage on the ring is reduced since some the Hole type packets waste bandwidth.

In dynamic reservation, if a station has no packets to sends, no Hole packet are sent. When there are packets to send, and available bandwidth is limited, Hole+data packet are sent for its portion of bandwidth equal to its reserved rate. This method allows a station to slowly wedge itself into the ring until it has its desired bandwidth. One advantage to using dynamic reservation is that ring bandwidth utilization is very good since no bandwidth is wasted. One disadvantage is that the jitter for a station may be higher as it may take longer to respond until the required bandwidth is reserved.

Both dynamic and static reservation systems allow a station to reserve bandwidth for itself even if the other stations on the ring do not participate into the fairness protocol. As such, the schemes may be used in older stations or stations from other venders that do not support fairness.

Thus the present invention provides a method and apparatus for guaranteeing bandwidth to stations in a ring network, and thereby overcomes problems associated with station starvation. Although the method and apparatus are effective at overcoming starvation issues, fine tuning of the performance can be further obtained by adjusting the tax values associated with the stations in a manner that will now be described. By fine tuning the tax values, the amount of dummy packets that are unused can be minimized, thereby maximizing the overall performance of the network.

Figure 7:
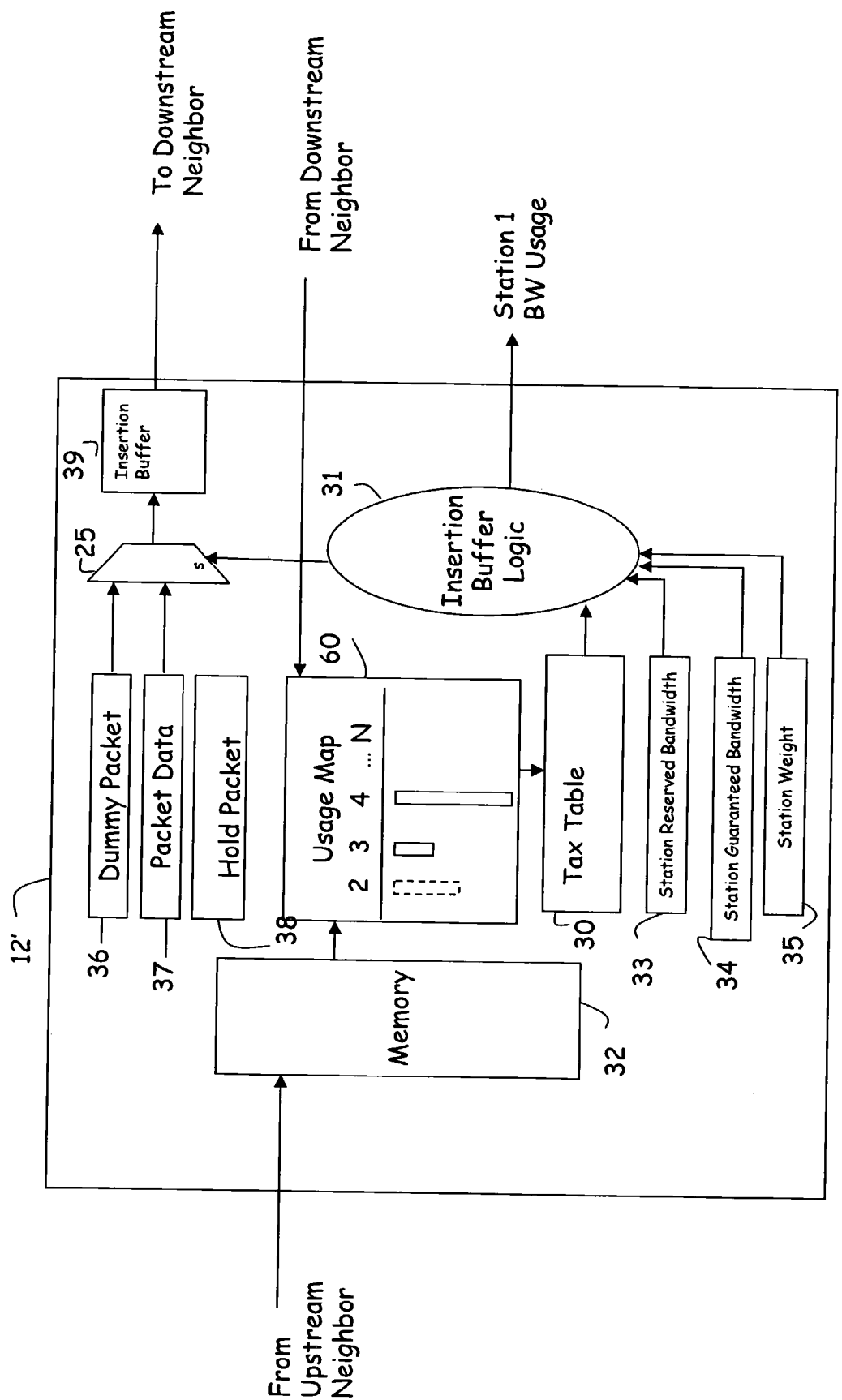
FIG. 7 is a block diagram illustrating some exemplary components that may be included in a second embodiment of a station according to the present invention.

Referring briefly to FIG. 7, an alternate embodiment of station 12 is shown to be station 12'. In this embodiment of the station, a usage map 60 is stored in the station. The usage map 60 collects data fed back from each of the other stations in the ring regarding the actual bandwidth usage at the station. For example, the stations may indicate how many dummy packet time slots were actually used by the station during a given time period. Once this information is obtained, the tax table values can be adjusted to reflect the actual usage of the individual stations. This can be achieved by associated logic encompassed in the apparatus monitoring the usage map and updating entries in the tax table accordingly.

Accordingly a method and apparatus has been described that completely eliminates starvation of a station in a ringed network environment using minimal complexity. The method and apparatus may be implemented in hardware, software, or any combination thereof, and may take a variety of different steps in achieving the end results. Therefore, having described a number of embodiments, it should be understood that the present limitation is not limited to that described herein, but rather should only be limited by the spirit and the scope of the claims provided below.

What is claimed is:

1. A method of controlling a first rate of transmission of packets at a station, the station coupled to at least one other station coupled in a ring arrangement, the method comprising the steps of:
   determining a credit bandwidth of the at least one other station, the credit bandwidth corresponding to a second rate of transmission of packets allocated to the at least one other station;
   transmitting available packets at the station to downstream stations in the network; and
   reserving bandwidth for the at least one other station for each available packet that transits the at least one station by transmitting tax packets to the at least one other station for each packet that transits through the at least one station, wherein a number of the tax packets corresponds to the credit bandwidth of the at least one other station.

2. The method of claim 1, wherein the credit bandwidth is determined according to a reserved bandwidth of the at least one other station.

3. The method of claim 1, wherein the credit bandwidth is determined according to a guaranteed bandwidth of the at least one other station.

4. The method of claim 1, wherein the credit bandwidth is determined according to a weight of the at least one other station.

5. The method of claim 1, wherein the tax packets comprise dummy packets.

6. The method of claim 1, further comprising the step of adjusting the credit bandwidth allocated to at least one other station in response to an actual rate of transmission of packets the at least one other station.

7. The method according to claim 1, wherein an intermediate station is disposed between the station and the at least one other station, the intermediate station allocated an intermediate bandwidth credit, the method comprising the steps of provisioning a bandwidth to the intermediate station corresponding to the intermediate bandwidth for each transmission to the at least one other station that transits through the intermediate station.

8. The method of claim 1, wherein an intermediate station is disposed between the station and the at least one other station, and an intermediate credit is allocated to the intermediate stations, wherein the number of the tax packets transmitted by the station corresponds to a sum of the intermediate credit and the credit bandwidth of the at least one station.

9. A station in a unidirectional ring architecture comprising:
   means for guaranteeing bandwidth to a downstream station that is downstream from the station on the unidirectional ring, including means for allocating a determined number of transmit slots to the downstream station for each packet that transits through the downstream station, wherein the means for allocating a determined number of transmit slots to the downstream station comprises:
   means for storing a tax value for each one of a plurality of other stations in the unidirectional ring;
   means for determining a total tax associated with forwarding packets from the station to the downstream station; and
   means for forwarding, for each packet transferred between the station and the downstream station, a number of tax packets corresponding to the total tax.

10. The station of claim 9, wherein the means for determining the total tax comprises:
    means for determining which ones of the plurality of other stations in the unidirectional ring are disposed between the station and the downstream station;
    means for summing the tax values of each of the plurality of other stations that are determined to be between the station and the downstream station to provide the total tax.

11. The station of claim 9 further comprising feedback means, for receiving bandwidth usage associated with at least one other station and for adjusting the stored tax value of the at least one other station.

12. A method of guaranteeing bandwidth to a downstream station that is downstream from a station in a ring arrangement, including the step of:
    allocating a determined number of transmit opportunities to the downstream station for each packet that transits through the downstream station, wherein the step of allocating a determined number of transmit opportunities to the downstream station includes the steps of:
    storing a tax value for each one of a plurality of other stations in the unidirectional ring;
    determining a total tax associated with forwarding packets from the station to the downstream station; and
    forwarding, for each packet transferred between the station and the downstream station, a number of tax packets corresponding to the total tax.

13. The method of claim 12, wherein the step of determining the total tax comprises:
    determining which ones of the plurality of other stations in the unidirectional ring are disposed between the station and the downstream station; and
    summing the tax values of each of the plurality of other stations that are determined to be between the station and the downstream station to provide the total tax.

14. The method of claim 12 further comprising the step of receiving bandwidth usage associated with at least one other station and for adjusting the stored tax value of the at least one other station.

\* \* \* \* \*